(12) United States Patent
Raimbault et al.

(10) Patent No.: US 10,094,299 B2
(45) Date of Patent: Oct. 9, 2018

(54) CONTROL SYSTEM OF AT LEAST ONE FLAP OF A FLUID DUCT AND FLUID DUCT SYSTEM

(71) Applicant: Mann+Hummel GMBH, Ludwigsburg (DE)

(72) Inventors: Vincent Raimbault, Cosmes (FR); Jérôme Migaud, Vitré (FR)

(73) Assignee: MANN+HUMMEL GmbH, Ludwigsburg (DE)

( * ) Notice: Subject to any disclaimer, the term of this patent is extended or adjusted under 35 U.S.C. 154(b) by 92 days.

(21) Appl. No.: 15/146,422

(22) Filed: May 4, 2016

(65) Prior Publication Data

US 2016/0245189 A1 Aug. 25, 2016

Related U.S. Application Data

(63) Continuation of application No. PCT/EP2014/072084, filed on Oct. 15, 2014.

(30) Foreign Application Priority Data

Nov. 5, 2013 (EP) ..................... 13290271

(51) Int. Cl.
*F02D 9/10* (2006.01)
*F02D 11/04* (2006.01)
(Continued)

(52) U.S. Cl.
CPC ......... *F02D 9/1065* (2013.01); *F02D 9/1005* (2013.01); *F02D 9/1025* (2013.01); *F02D 11/04* (2013.01); *F02M 35/108* (2013.01); *F02M 35/10013* (2013.01); *F02M 35/10209* (2013.01); *F16K 31/44* (2013.01);
(Continued)

(58) Field of Classification Search
CPC .... F16K 17/19; F16K 17/196; F16K 31/5282; F16K 31/52441; F16K 31/521; F02D 9/1025; F02D 9/1065; F02D 9/1055; F02D 2009/0203; F02D 2009/0118;
(Continued)

(56) References Cited

U.S. PATENT DOCUMENTS

| 2,635,595 A | 4/1953 | Raleigh |
| 3,300,137 A * | 1/1967 | Murphy ............... F02M 31/083 137/527 |

(Continued)

FOREIGN PATENT DOCUMENTS

| DE | 1023268 B | 1/1958 |
| DE | 1123513 B | 2/1962 |

(Continued)

*Primary Examiner* — Matthew W Jellett
(74) *Attorney, Agent, or Firm* — James Hasselbeck

(57) ABSTRACT

A control system of at least one flap of a fluid duct of an intake system of an internal combustion engine, including: a swivel axis, at least one flap connected off-center to the swivel axis by which the at least one flap can be swiveled within the fluid duct between positions with different degrees of opening, a swivel lever connected to the swivel axis, the swivel lever pivoting the swivel axis, an elastic working return element connected directly or indirectly to the swivel lever and applying a force to the at least one flap to return the at least one flap toward a home position.

11 Claims, 4 Drawing Sheets

(51) Int. Cl.
    *F02M 35/108*    (2006.01)
    *F02M 35/10*     (2006.01)
    *F16K 31/44*     (2006.01)
    *F02D 9/02*      (2006.01)

(52) U.S. Cl.
    CPC ........... *F02D 2009/0203* (2013.01); *F02D 2009/0218* (2013.01); *F02D 2009/0269* (2013.01)

(58) Field of Classification Search
    CPC ....... F02D 2009/0269; Y10T 137/7898; Y10T 137/7902
    USPC ....... 251/235, 236, 237, 238, 243, 300, 301, 251/303, 305–308; 137/527, 527.6
    See application file for complete search history.

(56)              References Cited

U.S. PATENT DOCUMENTS

| | | | | |
|---|---|---|---|---|
| 3,395,727 | A | * | 8/1968 | Weise ................... F16K 15/033 137/305 |
| 3,737,142 | A | * | 6/1973 | Boswell ................. F15B 21/02 251/58 |
| 4,450,807 | A | | 5/1984 | Kinoshita et al. |
| 4,616,518 | A | * | 10/1986 | Nusser ................... F02M 19/12 123/400 |
| 4,858,567 | A | | 8/1989 | Knapp |
| 5,355,673 | A | * | 10/1994 | Sterling ................. F01N 13/082 137/527 |
| 7,434,570 | B2 | | 10/2008 | Hill |
| RE42,939 | E | * | 11/2011 | Yamada ................... F02D 9/02 123/396 |
| 8,783,664 | B2 | * | 7/2014 | Arai ...................... F02D 9/1025 123/179.18 |
| 9,038,381 | B2 | * | 5/2015 | Ehrmann .............. F02B 37/186 60/602 |
| 9,109,708 | B2 | * | 8/2015 | Telep .................. F01M 13/0011 |
| 2004/0055814 | A1 | | 3/2004 | Chae |
| 2013/0152895 | A1 | | 6/2013 | Yasuda |
| 2015/0354709 | A1 | * | 12/2015 | Okami ...................... F01N 5/02 251/298 |

FOREIGN PATENT DOCUMENTS

| | | |
|---|---|---|
| DE | 3743056 A1 | 7/1988 |
| DE | 4243134 A1 | 6/1994 |
| DE | 19737545 A1 | 3/1999 |
| DE | 102011101614 A1 | 11/2012 |
| JP | 2000054924 A | 2/2000 |
| JP | 2006307775 A | 11/2006 |

* cited by examiner

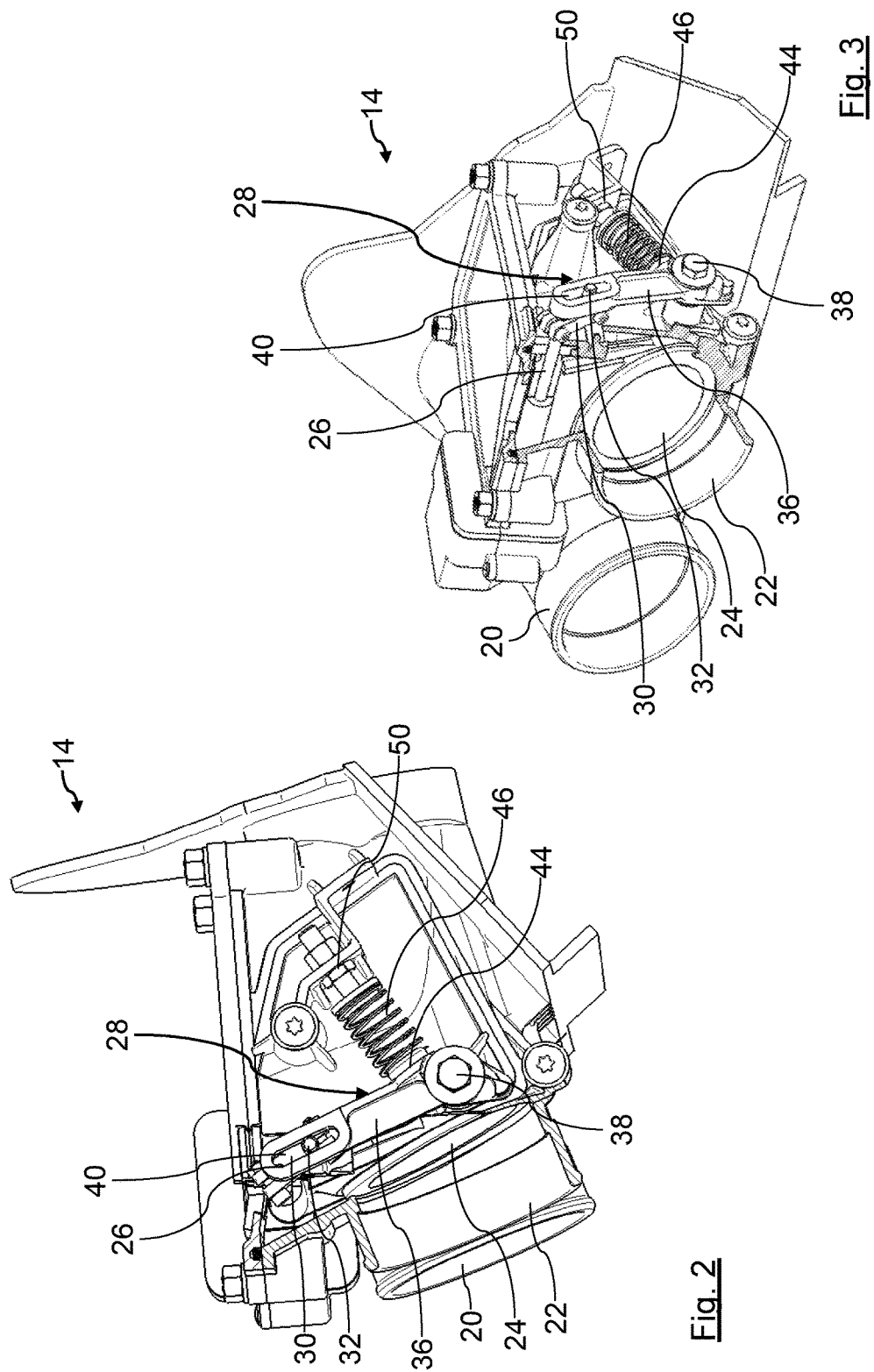

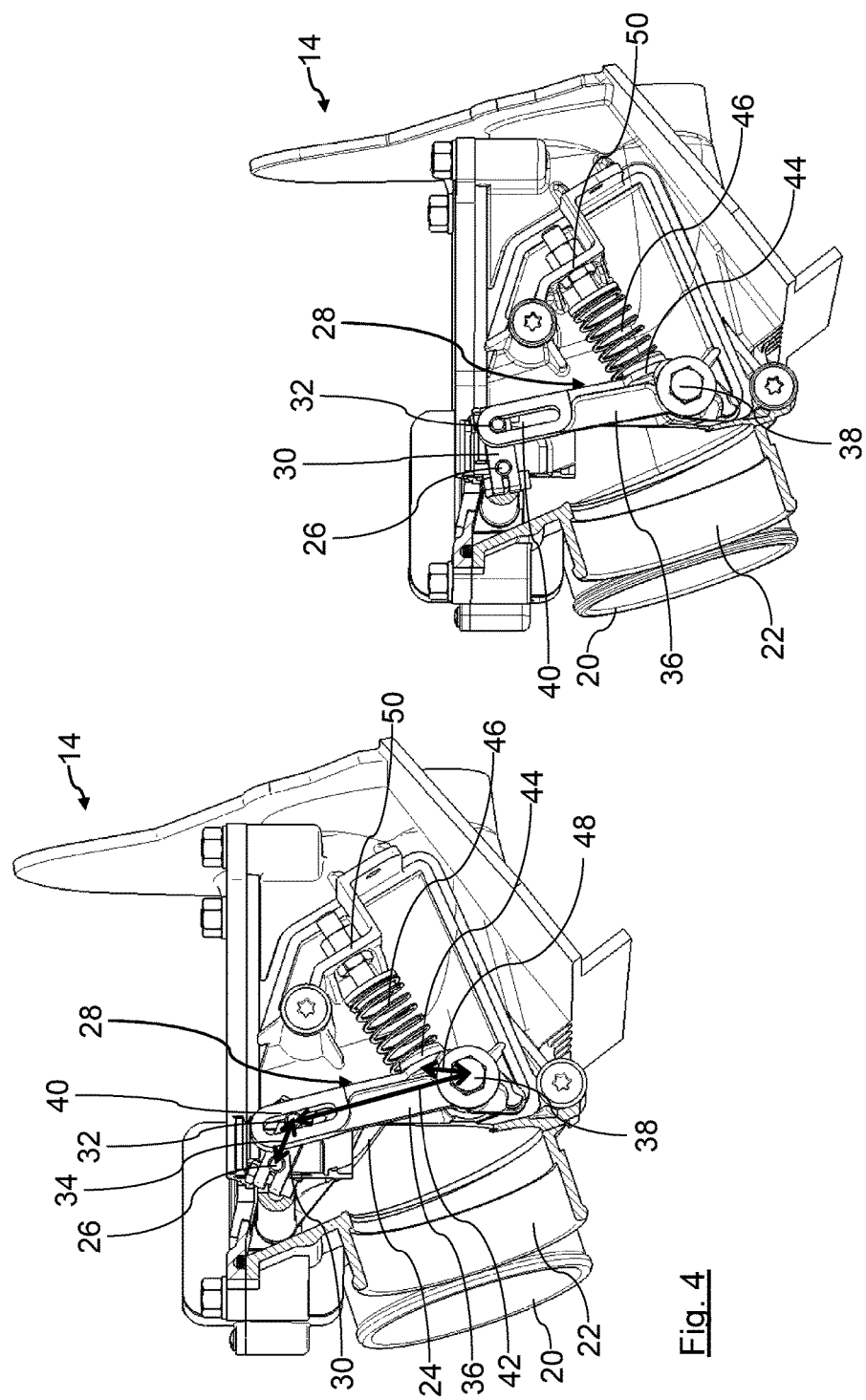

CONTROL SYSTEM OF AT LEAST ONE FLAP OF A FLUID DUCT AND FLUID DUCT SYSTEM

TECHNICAL FIELD

The present invention relates to a control system of at least one flap of a fluid duct, in particular of an intake system, in particular of an internal combustion engine, in particular of a motor vehicle, having at least one swivel axis, which is connected off-centered to the at least one flap and by which the at least one flap can be swiveled in the fluid duct between positions with different degrees of opening, having at least one swivel lever, which is connected to the at least one swivel axis for pivoting the at least one swivel axis, and having at least one elastic working return element, which is connected directly or indirectly to the at least one swivel lever and which forces the at least one flap toward a home position.

Further the present invention relates to a fluid duct system with at least one fluid duct, in particular of an intake system, in particular of an internal combustion engine, in particular of a motor vehicle, including at least one control system of at least one flap having at least one swivel axis, which is connected off-centered to the at least one flap and by which the at least one flap can be swiveled in the at least one fluid duct between positions with different degrees of opening, having at least one swivel lever, which is connected to the at least one swivel axis for pivoting the at least one swivel axis, and having at least one elastic working return element, which is connected directly or indirectly to the at least one swivel lever and which forces the at least one flap toward a home position.

BACKGROUND OF THE INVENTION

The US 2008/0223025 A1 discloses a passive, exhaust pressure actuated valve assembly for placement inside a tubular exhaust conduit which is pivotally mounted to an off-center axle for rotation between fully closed and fully opened positions. A bias element forces the valve flap toward the fully closed position. The valve flap is shaped in a manner enabling use of the interior surface of the exhaust conduit to define stops at the full closed and full opened positions. The valve flap shape, in conjunction with the bias element arrangement, enables the flap to lie substantially parallel to a longitudinal axis of the conduit in the fully opened position, which provides for minimum back pressure in the conduit. The valve assembly finds particular advantageous use inside the bypass through pipe of a muffler assembly.

SUMMARY OF INVENTION

It is an object of the invention to provide a control system and a fluid duct system of the above-mentioned kind, where the at least one flap has improved opening and/or closing characteristics.

The object is achieved with the control system by an actuating lever, which is mounted to a housing part of the fluid duct swiveling round a rotation axis and which is mounted to the swivel lever swiveling round a connection axis and which has a working surface in which the at least one return element applies to the actuating lever, wherein the rotation axis, the connection axis and the swivel axis are parallel to each other and wherein a distance radial to at least one of the respective axis between the rotation axis and the connection axis and/or between the swivel axis and the connection axis and/or the working surface and the connection axis and/or between the working surface and the rotation axis is varying dependent on the opening/closing position of the at least one flap.

Favourably, a two-lever-system is used for controlling the at least one flap. According to the invention, the relationships of the levers are varying during a movement of the at least one flap. The length of the respective lever arms for realizing a torque at a respective axis is defined by the radial distance of the axis/working surface each. The torque which can apply on the swivel axis can vary dependent on the opening/closing position of the at least one flap. The opening/closing position of the at least one flap corresponds to a rotation angle of the swivel axis. So, the torque on the swivel axis can depend on the rotation angle. The torque on the swivel axis can be caused by a prestressing force or a reset force of the at least one return element and/or an opening force caused by the fluid pressing against the at least one flap.

Particularly, a course of torque dependent on the rotation angle of the swivel axis can be a kind of sinusoidal. Favourably, the torque can have a maximum at a rotation angle of 0° based on the home position for the at least one flap. The torque can have a reduced value, in particular a minimum, at a rotation angle which corresponds to a degree of opening of the at least one flap of 70°.

With the inventive two-lever-system a slope of the torque with the opening angle can be steeper compared to an one-lever-system known from state-of-the-art.

Advantageously, the stiffness, in particular the spring constant, of the system, in particular the return element, can be between approximately 1000 N/m and 2000 N/m, preferably approximately 1414 N/m.

The opening and closing of the at least one flap can be passive controlled automatically by coaction of a fluid pressure and a force by the at least one return element.

The flap on the one hand can be moved passively by the mass flow rate of the fluid through the fluid duct or the difference of pressure upstream and downstream the flap respectively.

On the other hand the at least one return element can passively force the at least one flap against external forces toward its home position. External forces can be caused in particular by the fluid current through the fluid duct. The at least one flap can be moved by such an external force against the force of the at least one return element in a position different from its home position. The at least one return element can return the at least one flap in its home position when the external force decreases.

Advantageously, no active element, in particular no electric actuator system, particularly no motor, is required for the operation of the control system, in particular for generating and/or changing the torque on the swivel axis. The levers and the at least one return element are passive elements. The control system can work completely passive. Additionally, the construction so can be realized easier, more robust, more reliable and/or lighter.

Preferably, no mass element, in particular no balancing weight, is required for the operation of the control system, in particular for generating and/or changing the torque.

Thus, the control system can be less sensitive to variations of its mounting orientation. The control system and/or the at least one flap can be mounted in different orientations. Particularly, the at least one flap can be orientated in its home position horizontally or vertically. Further, the construction can be realized easier, more robust, more reliable and/or lighter.

Particularly, the torque on the swivel axis can be tuned according to the requirements of the fluid duct.

The length of the levers of the two-lever-system each can be shorter compared to an one-lever-system. Thus, the space required for pivoting the levers can be reduced. Further a size of the at least one return element can be reduced. Thus, the durability of the at least one return element can be improved.

Altogether, the installation space required by the inventive two-lever-system can be smaller compared to the one-lever-system.

Preferably, the at least one return element can be a separate component. Thus, the at least one return element can easy be replaced. Particularly, different types of return elements can be used with the control system according to the requirements.

With the two-lever-system the choice of applicable return elements can be increased.

Advantageously, a stiffness of the at least one return element can be increased compared to a one-lever-system. Thus, a durability of the at least one return element can be further improved.

Advantageously, a radial distance between the swivel axis and the connection axis can be constant. Particularly, this radial distance can be between approximately 8 mm and 16 mm, preferably 12 mm.

Advantageously, the radial distance between the rotation axis and the working surface 44 can be constant. Particularly, this radial distance can be between approximately 11 mm and 19 mm, preferably 15 mm.

Advantageously, the radial distance between the rotation axis and the connection axis can vary dependent on the opening/closing position of the at least one flap. Particularly, this radial distance can vary between approximately 35 mm and 60 mm, preferably approximately between 40 mm and 60 mm. Particularly, this radial distance in the home position of the at least one flap can be between approximately 42 mm and 48 mm, preferably 45 mm.

A ratio of the radial distance between the swivel axis and the connection axis to the radial distance between the rotation axis and the working surface 44 can be between approximately 3/5 and 6/5, preferably approximately 4/5.

A ratio of the radial distance between the rotation axis and the connection axis to the radial distance between the swivel axis and the connection axis can be between approximately 35/12 and 60/12, preferably between approximately 45/12 and 60/12.

Particularly, the home position of the at least one flap can correspond to its closed position. In its closed position the at least one flap can minimize an orifice of the fluid duct there. Preferably, in its closed position the at least one flap can fully close the fluid duct. In its open position the at least one flap can maximize the orifice of the fluid duct there. Preferably, in its open position the at least one flap can fully open the fluid duct.

Advantageously, the swivel lever and/or the actuating lever can be elongated levers. Alternatively the levers can be realized as part of an element each which can be somehow shaped.

In terms of the invention, the swivel axis, the connection axis and/or the rotation axis each can be realized by a virtual or a real axis each, which can act as a center of rotation for the respective lever.

Advantageously, the swivel axis and/or the connection axis and/or the rotation axis can be realized by a pin-like or rod-like element each.

Particularly, the swivel axis can be configured in one piece or in several parts with the at least one flap and/or the at least one swivel lever.

Particularly, the connection axis can be configured in one piece or in several parts with the at least one swivel lever of the at least one actuating lever.

Particularly, a direction component of a force of the at least one return element can be crosswise, preferably almost perpendicular, to the rotation axis and/or the connection axis. Thus, the at least one return element can cause a respective torque acting on the rotation axis and/or the connection axis. Particularly, the direction of the force of the at least one return element can be crosswise, preferably perpendicular, to the actuating lever.

The at least one flap can be shaped accordant to the interior surface of the fluid duct. Thus, the at least one flap can close the orifice completely. In its open position, the at least one flap can lie substantially parallel to a longitudinal axis of the fluid duct.

Advantageously, the control system of the at least one flap can be used with an intake system of an internal combustion engine of a motor vehicle. With the at least one flap a current of combustion air through an air duct can be affected. The combustion air can be led to an air cleaner or to the internal combustion engine.

Particularly, the fluid duct with the at least one flap with the control system can be part of a fluid duct system having at least two fluid ducts. Preferably, the at least two fluid ducts can be parallel relating to a fluid flow.

The invention is not limited to an internal combustion engine of a motor vehicle. The invention can also be applied for other kinds of internal combustion engines, particularly industrial engines. The invention can further be applied for other kinds of fluid systems, in particular for gases or liquids. It can also be used for an exhaust system of an internal combustion engine of a motor vehicle. Alternatively, it can be used for an inside air system of a motor vehicle. Particularly, the invention can be used with a clean side duct or a charged air duct.

According to a favorable embodiment the distance between the rotation axis and the connection axis and/or between the swivel axis and the connection axis and/or between the working surface and the connection axis and/or between the working surface and the rotation axis can vary automatically dependent on the opening/closing position of the at least one flap. Thus, the respective torque(s) can be changed automatically.

According to another favorable embodiment the actuating lever or the swivel lever can have an elongated guidance element, in particular a guidance groove, especially a long hole, and the swivel lever or the actuating lever can have an actuating element, in particular a pivot, which can be movable arranged in/at the guidance element wherein the actuating element can realize the connection axis.

The actuating element can be guided along the guidance element. In this way, the connection axis can exactly be moved relative to the rotation axis and/or the working surface or relative to the swivel axis respectively. In the guidance groove the actuating element can be guided on opposite sides. Thus, the guidance can be further improved.

Preferably, the course of the guidance element can be predetermined in order to achieve specific opening/closing characteristics of the at least one flap.

According to another favorable embodiment the guidance element can extend from radial inside to radial outside relating to the rotation axis.

According to another favorable embodiment the guidance element can at least partially be straight.

According to a further favorable embodiment the guidance element can at least partially be curved.

Preferably, a radial outer face of the curved guidance element can face the swivel axis.

According to another favorable embodiment the working surface can be arranged between the connection axis and the rotation axis. In this way, a force transmission from the at least one return element to the actuating lever can be improved. Besides, the required installation space can be further reduced.

Particularly, the working surface can be arranged nearby the rotation axis.

According to another favorable embodiment the working surface and the swivel axis of the flap can be on opposite sides of the actuating lever. Thus, the installation space of the control system can be further reduced.

According to a further favorable embodiment the at least one return element can have at least one bias element. In this way, the opening and closing characteristics of the at least one flap can be further improved.

Particularly, the at least one return element can have at least one spring element. The spring element can include/be a helical compression spring and/or a traction spring and/or a compression spring and/or a torsion spring and/or a tension spring and/or a coil spring or another kind of spring.

Advantageously, the at least one flap can include some soft material. With the soft material the airtightness can further be improved. Particularly, the at least one flap can be overmolded with the soft material.

Advantageously, the control system can include a damper system. With a damper system oscillation of the at least one flap can be reduced. Preferably, oscillations can be avoided.

The object is further achieved with the fluid duct system by an actuating lever, which is mounted to a housing part of the fluid duct swiveling round a rotation axis and which is mounted to the swivel lever swiveling round a connection axis and which has a working surface, in which the at least one return element applies to the actuating lever, wherein the rotation axis, the connection axis and the swivel axis are parallel to each other and wherein a distance radial to at least one of the respective axis between the rotation axis and the connection axis and/or between the swivel axis and the connection axis and/or between the working surface and the connection axis and/or between the working surface and the rotation axis is varying dependent on the opening/closing position of the at least one flap.

The above-mentioned advantages and an characteristic features of the inventive control system apply analogously to the inventive fluid duct system and its favorable embodiments and vice versa.

According to a favorable embodiment the fluid duct system can have at least two fluid ducts. Preferably, at least two of the fluid ducts can be parallel relating to a fluid flow. Thus, fluid can flow through one or more fluid ducts.

Particularly, at least two of the fluid ducts can have approximately equal cross-section areas especially over the whole length.

At least two of the fluid ducts can have separate housings.

At least two of the fluid ducts can be realized in one common housing. The common duct housing can be separated into at least two sections especially by at least one interior baffle to realize the different fluid ducts.

According to another favorable embodiment at least one of at least two fluid ducts can have a different flap and/or control system or no flap and/or no control system.

With different flaps and/or control systems, the fluid ducts can be opened under different operating conditions.

Particularly, fluid always can flow through the at least one fluid duct without flap.

The at least one fluid duct with at least one flap can be switched on and off into a kind of bypass mode. Dependent on operating conditions, a fluid flow through the at least one fluid duct with the at least one flap can be controlled by the respective control system. The at least one flap can open automatically when the flow rate is exceeding a specific value. The at least one flap can close when the air flow rate falls below a specific value.

Advantageously, the fluid duct system can be used with an intake system of an internal combustion engine. The orifice flap in an air duct, in particular for dirty air or untreated air, parallel to a constantly open air duct, in particular for dirty air or untreated air, can reduce orifice noise at low fluid mass flow rates.

BRIEF DESCRIPTION OF DRAWINGS

The present invention together with the above-mentioned and other objects and advantages may best be understood from the following detailed description of the embodiments, but not restricted to the embodiments, wherein is shown schematically FIG. 1 an intake system of an internal combustion engine of a motor vehicle including an air filter and an air duct system with two air ducts, wherein one of the air ducts has a flap with a control system;

FIG. 2 a local section of the air duct system of FIG. 1, wherein the flap is closed;

FIG. 3 the local section of the air duct system of FIG. 2 from a different angle;

FIG. 4 the local section of the air duct system of FIG. 2, wherein the flap is half-opened;

FIG. 5 the local section of the air duct system of FIGS. 2 and 4, wherein the flap is fully opened;

Figure 1:
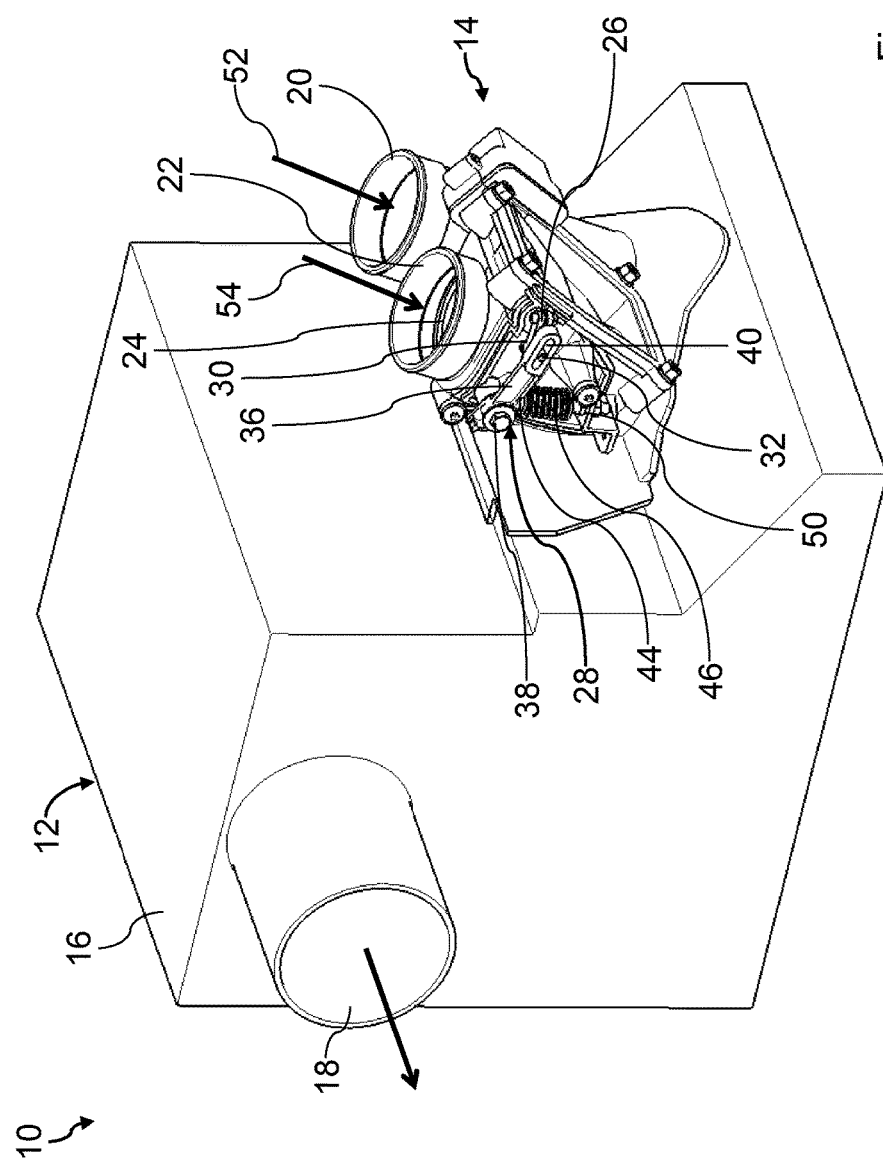

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

SUMMARY OF INVENTION

FIG. 1 depicts an air intake system 10 of an internal combustion engine of a motor vehicle including an air filter 12 and an air duct system 14. The air duct system 14 is mounted upstream on a housing 16 of the air filter 12. An air outlet 18 of the housing 16 of the air filter 12 is connected by a not shown clean air pipe with the internal combustion engine. In FIGS. 2 to 5 the air duct system 14 is shown in different perspectives and operational states.

The air duct system 14 has two air ducts, namely a main air duct 20 and a bypass air duct 22. The air ducts 20 and 22 are parallel relating to an air flow. Thus, air can flow through one or both air ducts 20 and 22. The air ducts 20 and 22 have approximately equal cross-section areas over their whole length. Each air duct 20 and 22 leads to an air inlet of the housing 16 of the air filter 12, which is hidden in FIG. 1.

A flap 24 is inside of the bypass air duct 22. With the flap 24 a current of combustion air through the bypass air duct 22 can be affected. The main air duct 20 has no flap.

The flap 24 is shaped accordant to the interior surface of the bypass air duct 22. The flap 24 is swivel-mounted to the bypass air duct 22 by a swivel axis 26. The swivel axis 26 is connected off-centered to the flap 24. The swivel axis 26 is part of a two-lever-control system 28 for controlling the flap 24. The flap 24 can be swiveled by the swivel axis 26 between positions with different degrees of opening. In its closed position, shown in FIGS. 1 to 3, the flap 24 closes the orifice completely. The closed position is the home position of the flap 24. In its open position, shown in 5, the flap 24 lies substantially parallel to a longitudinal axis of the bypass air duct 22.

The swivel axis 26 is pivot-mounted in the housing of the bypass air duct 22. Outside the bypass air duct 22, one end of the swivel axis 26 is fixed to an elongated swivel lever 30. The swivel axis 26 can be pivoted by the swivel lever 30. Contrariwise the swivel lever 30 can be swiveled by the swivel axis 26. The swivel lever 30 extends perpendicular to the swivel axis 26 approximately parallel to a plane of the flap 24. A free end of the swivel lever 30 thereby is on the same side of the swivel axis 26 like the flap 24.

A connection axis 32 realized by a pivot is fixed permanently to the swivel lever 30 near its free end. The connection axis 32 is parallel to the swivel axis 26. It extends on the side of the swivel lever 30, which is opposite to the flap 24.

A distance 34 radial to the swivel axis 26 between the swivel axis 26 and the connection axis 32 is constant. For the sake of clarity, the radial distance 34 is marked only in FIG. 4 with a reference numeral. The radial distance 34 is 12 mm.

Further, the control system 28 has an elongated actuating lever 36. The actuating lever 36 is mounted to the housing of the bypass air duct 22 swiveling round a rotation axis 38. The rotation axis 38 is realized by a machine bolt. The rotation axis 38 is parallel to the swivel axis 26 and parallel to the connection axis 32. The rotation axis 38 is arranged on a side of the bypass air duct 22 which circumferential is far from the swivel axis 26. The actuating lever 36 is perpendicular to the rotation axis 38, to the connection axis 32 and to the swivel axis 26 each. In the closed position of the flap 24 the actuating lever 36 extends approximately tangential to the radial outer circumferential side of the bypass air duct 22.

The actuating lever 36 has near its end which is opposite to the rotation axis 38 a long hole 40. The long hole 40 serves as a guidance element for the connection axis 32. The long hole 40 has a straight shape. In longitudinal direction the long hole 40 extends radial to the rotation axis 38 from radial inside to radial outside.

The connection axis 32 is supported shiftable in the long hole 40. In the guidance groove of the long hole 40 the connection axis 32 is guided on opposite sides. The actuating lever 36 is mounted to the swivel lever 30 swiveling round the connection axis 32 in the long hole 40.

A distance 42 radial to the rotation axis 38 between the rotation axis 38 and the connection axis 32 can be changed automatically dependent on the opening/closing position of the flap 24. This radial distance 42 can vary between approximately 45 mm and 60 mm. In the closing position of the flap 24 the radial distance 42 is 45 mm.

A ratio of the radial distance 42 between the rotation axis 38 and the connection axis 32 to the radial distance 34 between the swivel axis 26 and the connection axis 32 can be between approximately 45/12 and 60/12.

The actuating lever 36 further has a working surface 44 in which a return element 46 applies to the actuating lever 36. The working surface 44 and the swivel axis 26 are on opposite sides of the actuating lever 36. The working surface 44 is between the connection axis 32 and the rotation axis 38 nearby the rotation axis 38.

A distance radial to the rotation axis 38 between the rotation axis 38 and a center of the working surface 44 is constant. This radial distance 48 is 15 mm.

A ratio of the radial distance 34 between the swivel axis 26 and the connection axis 32 to the radial distance 48 between the rotation axis 38 and the working surface 44 is constant. It is approximately 4/5.

A distance radial to the connection axis 32 between the working surface 44 and the connection axis 32 is also varying automatically dependent on the opening/closing position of the flap 24.

A length of the respective lever arms for realizing a respective torque at a respective axis is defined by the respective radial distances 34, 42 and 48 of the axis/working surface each.

The return element 46 is realized by an elastic working helical compression spring. The return element 46 rests with one end on the working surface 44 of the actuating lever 36. With the other end the return element 46 rests on a support 50 of the housing of the bypass air duct 22. The return element 46 is prestressed. The spring constant of the return element 46 is around 1414 N/m.

A force transmission from the return element 46 to the actuating lever 36 is almost tangential to a virtual circle around the rotation axis 38. In the closed position of the flap 24 a direction of the force caused by the return element 46 is almost perpendicular to a plane which is spanned by the rotation axis 38 and the connection axis 32. The return element 46 causes a force which can effect a torque acting on the rotation axis 38 and/or the connection axis 32.

The return element 46 is connected indirectly by the actuating lever 36 to the swivel lever 30. Thus, the return element 46 can cause a force which effects a respective torque on the swivel axis 26. The return element 46 forces the at least one flap 24 toward its close position.

Combustion air is sucked into the main air duct 20 during operation of the internal combustion engine. The flow direction of the combustion air is indicated in FIG. 1 by an arrow 52.

Initially, the bypass air duct 22 is closed by the flap 24. With help of the swivel lever 30 and the actuating lever 36 the return element 46 forces the flap 24 against external forces in its home position. External forces can be caused for example by a pressure difference on opposed sides of the flap 24. The torque applied on the swivel axis 26 is caused by the force of the return element 46 and an opening force of the air flow acting on the flap 24.

The flap 24 opens automatically when the air flow rate is exceeding a specific value. The flap 24 is controlled passively by the volume flow rate of the air through the bypass air duct 22.

Dependent on operating conditions, the air flow through the bypass air duct 22 is controlled by the control system 28. The direction of any air flow through the bypass air duct 22 is indicated in FIG. 1 by an arrow 54. FIG. 4 shows the flap 24 in half open position. In FIG. 5 the flap 24 is shown in its open position.

For opening, the flap 24 swivels in direction 54 of the air flow. Thereby, it turns the swivel axis 26. The swivel axis 26 swivels the swivel lever 30. With the connection axis 32, the swivel lever 30 swivels the actuating lever 36 against the force of the return element 46.

During the opening process of the flap 24, the connection axis 32 is guided along the long hole 40. The connection axis 32 is moved away from the rotation axis 38 and the working surface 44. The course of the long hole 40 is predetermined in order to achieve specific opening/closing characteristics of the flap 24.

By the movement of the connection axis 32 in the long hole 40, the relationship of the levers is varying during the movement of the flap 24. The torque on the swivel axis 26 varies dependent on the opening/closing position of the flap 24.

The opening/closing position of the at least one flap 24 corresponds to a rotation angle of the swivel axis 26. So the torque is depend on the rotation angle. A course of torque dependent on the rotation angle of the swivel axis 26 is a kind of sinusoidal. The torque has a maximum at a rotation angle of 0° based on the close position of the flap 24. The torque has a reduced value at a rotation angle which corresponds to an degree of opening of the flap 24 of 70%.

When the air mass flow decreases the return element 46 with help of the actuating lever 36, the swivel lever 30 and the swivel axis 26 returns the flap 24 in direction of its close position.

Combustion air always can flow through the main air duct 20. The bypass air duct 22 is switched on and off into a kind of bypass mode.

Figure 6:
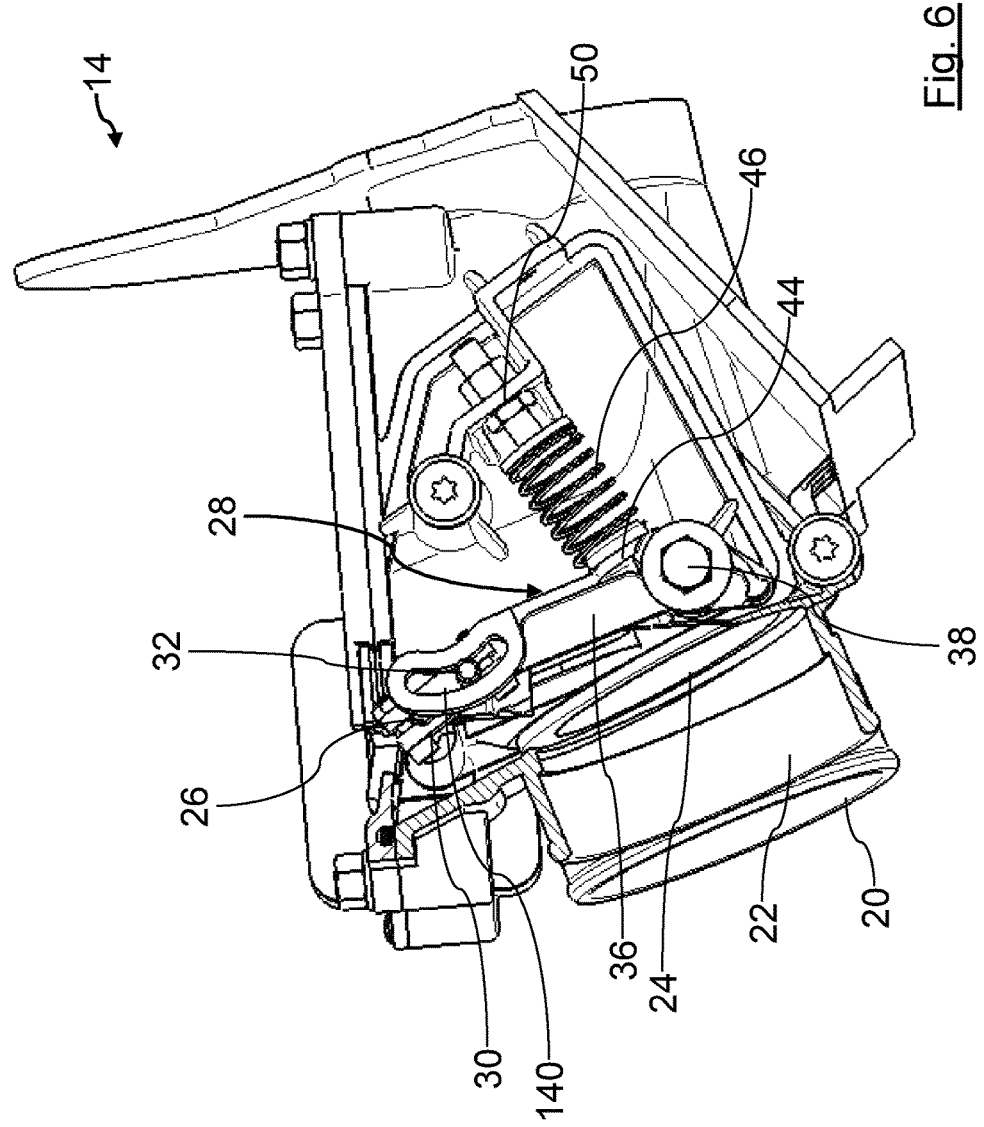
FIG. 6 a local section of an air duct system with an alternative control system for the flap.

FIG. 6 depicts a second embodiment of a control system 28. Different to the first embodiment, in the second embodiment a long hole 140 is curved. A radial outer face of the curved long hole 140 faces the swivel axis 26.

What is claimed is:

1. A control system of at least one flap of a fluid duct of an intake system of an internal combustion engine, comprising:
    a swivel axis;
    a rotation axis;
    at least one flap swivel-mounted directly on the swivel axis, mounted in an interior of the fluid duct, the flap rotating on the swivel axis, the at least one flap connected offcenter to the swivel axis by which the at least one flap swivels within the fluid duct between positions with different degrees of opening;
    a swivel lever connected to the swivel axis, the swivel lever pivoting the swivel axis;
    an actuating lever having a first end rotatably mounted to a housing part of the fluid duct and configured to swivel with the at least one flap, the actuating lever rotating around the rotation axis, the actuating lever having:
    a working surface;
    a spring acting as an elastic working return element connected indirectly to the swivel lever through the actuating lever, the spring having a first end resting directly on and apply a force to the working surface of the actuating lever, the spring applying a linearly aligned force to the at least one flap to return the at least one flap toward a home position;
    wherein the rotation axis, the connection axis and the swivel axis are parallel to each other;
    wherein a radial distance between the swivel axis and the working surface is varying dependent on the opening/closing position of the at least one flap;
    wherein the at least one flap is moved passively within the fluid duct between an open position and a closed position by an action of a differential pressure force of fluid pressures upstream and downstream of the flap, the differential pressure force acting against the linearly aligned force of the spring to position the at least one flap to the different degrees of opening, the differential pressure force and the linearly aligned force of the spring working alone to passively move the at least one flap without other actuating elements.

2. The control system according to claim 1, wherein the distance between the rotation axis and the connection axis and/or between the swivel axis and the connection axis and/or between the working surface and the connection axis and/or between the working surface and the rotation axis is varying automatically dependent on the opening/closing position of the at least one flap.

3. The control system according to claim 1, wherein the actuating lever includes an elongated guidance element in the form of a long hole forming a guidance groove or slot; and
wherein the swivel lever includes an actuating element in the form of a pivot pin or rod which is moveably arranged in the long hole of the guidance element;
wherein the actuating element realizes the connection axis.

4. The control system according to claim 3, wherein the guidance element extends radially in the actuating lever relative to the rotation axis.

5. The control system according to claim 3, wherein the guidance element is at least partially is curved.

6. The control system according to claim 1, wherein the working surface is arranged between the connection axis and the rotation axis.

7. The control system according to claim 1, wherein the working surface and the swivel axis of the flap are on opposite ends of the actuating lever.

8. The control system according to claim 1, wherein the elastic working return element includes at least one bias element.

9. A fluid duct system of an internal combustion engine, comprising:
    at least one fluid duct;
    a control system of at least one flap, including:
    a swivel axis;
    a rotation axis;
    at least one flap swivel-mounted directly on the swivel axis, mounted in an interior of the fluid duct, the flap rotating on the swivel axis, the at least one flap connected offcenter to the swivel axis by which the at least one flap swivels within the fluid duct between positions with different degrees of opening;
    a swivel lever connected to the swivel axis, the swivel lever pivoting the swivel axis;
    an actuating lever having a first end rotatably mounted to a housing part of the fluid duct and configured to swivel with the at least one flap, the actuating lever rotating around the rotation axis, the actuating lever having:
    a working surface;
    a spring acting as an elastic working return element connected indirectly to the swivel lever through the actuating lever, the spring having a first end resting directly on and apply a force to the working surface of the actuating lever, the spring applying a linearly aligned force to the at least one flap to return the at least one flap toward a home position;
    wherein the rotation axis, the connection axis and the swivel axis are parallel to each other;

wherein a radial distance between the swivel axis and the working surface is varying dependent on the opening/closing position of the at least one flap;

wherein the at least one flap is moved passively within the fluid duct between an open position and a closed position by an action of a differential pressure force of fluid pressures upstream and downstream of the flap, the differential pressure force acting against the linearly aligned force of the spring to position the at least one flap to the different degrees of opening, the differential pressure force and the linearly aligned force of the spring working alone to passively move the at least one flap without other actuating elements.

10. The fluid duct system according to claim 9, wherein the fluid duct system has at least two fluid ducts.

11. The fluid duct system according to claim 10, wherein at least one of at least two fluid ducts has a different flap and/or control system or no flap and/or no control system.

\* \* \* \* \*